United States Patent [19]
Morris et al.

[11] Patent Number: 5,390,239
[45] Date of Patent: Feb. 14, 1995

[54] METHOD FOR INCREASING DIGITAL DATA THROUGHPUT OVER TELEPHONE LINES

[76] Inventors: Gregory A. Morris, Rte. 1, Box 1752, Kellyville, Okla. 74039; Jeffrey D. Piotrowski, 18537 E. 121st St. South, Broken Arrow, Okla. 74011

[21] Appl. No.: 214,973
[22] Filed: Mar. 17, 1994
[51] Int. Cl.⁶ .......................................... H04M 11/00
[52] U.S. Cl. ........................................ 379/93; 379/97; 375/8; 375/38
[58] Field of Search .................. 375/38, 8; 370/118, 370/84; 379/90, 93, 96–99, 101, 94; 381/29, 31, 54; 455/59

[56] References Cited

U.S. PATENT DOCUMENTS

| | | | |
|---|---|---|---|
| H1175 | 4/1993 | Giorgio | 375/38 |
| 4,637,035 | 1/1987 | Betts | 375/8 |
| 4,734,920 | 3/1988 | Betts | 375/38 |
| 4,862,456 | 8/1989 | Giorgio | 370/118 |
| 4,864,567 | 9/1989 | Giorgio | 370/118 |
| 5,058,133 | 10/1991 | Duncanson et al. | 375/38 |
| 5,065,396 | 11/1991 | Castellano et al. | 370/84 |
| 5,293,378 | 3/1994 | Shimizu | 375/38 |

Primary Examiner—Wing F. Chan
Attorney, Agent, or Firm—Head & Johnson

[57] ABSTRACT

Transmission of digital data over existing telephone networks is limited by the data bit rate capacity of the telephone lines. This limitation is inherent in the nature of the existing communication lines e.g. copper wires and in the switching circuits that make the connections between telephone subscribers. Digital data may be transmitted over existing telephone lines but due to throughput limitation such transmission is exceedingly slow. A method is provided whereby a digital data file may be transmitted over a plurality of telephone lines simultaneously to increase the throughput and thus greatly increase the speed at which a given digital data file may be transmitted. The method does not require modification nor enhancement to the existing telephone network. The method consists of segregating the data file into smaller blocks of data, sequentially addressing such blocks and transmitting the blocks of data individually and concurrently over a plurality of telephone lines, with each successive block of data being sent over the next to be available telephone lines until all the blocks of data have been transmitted. At the receiving end the sequentially labeled blocks of data are reassembled to form a copy of the original digital data file.

1 Claim, 1 Drawing Sheet

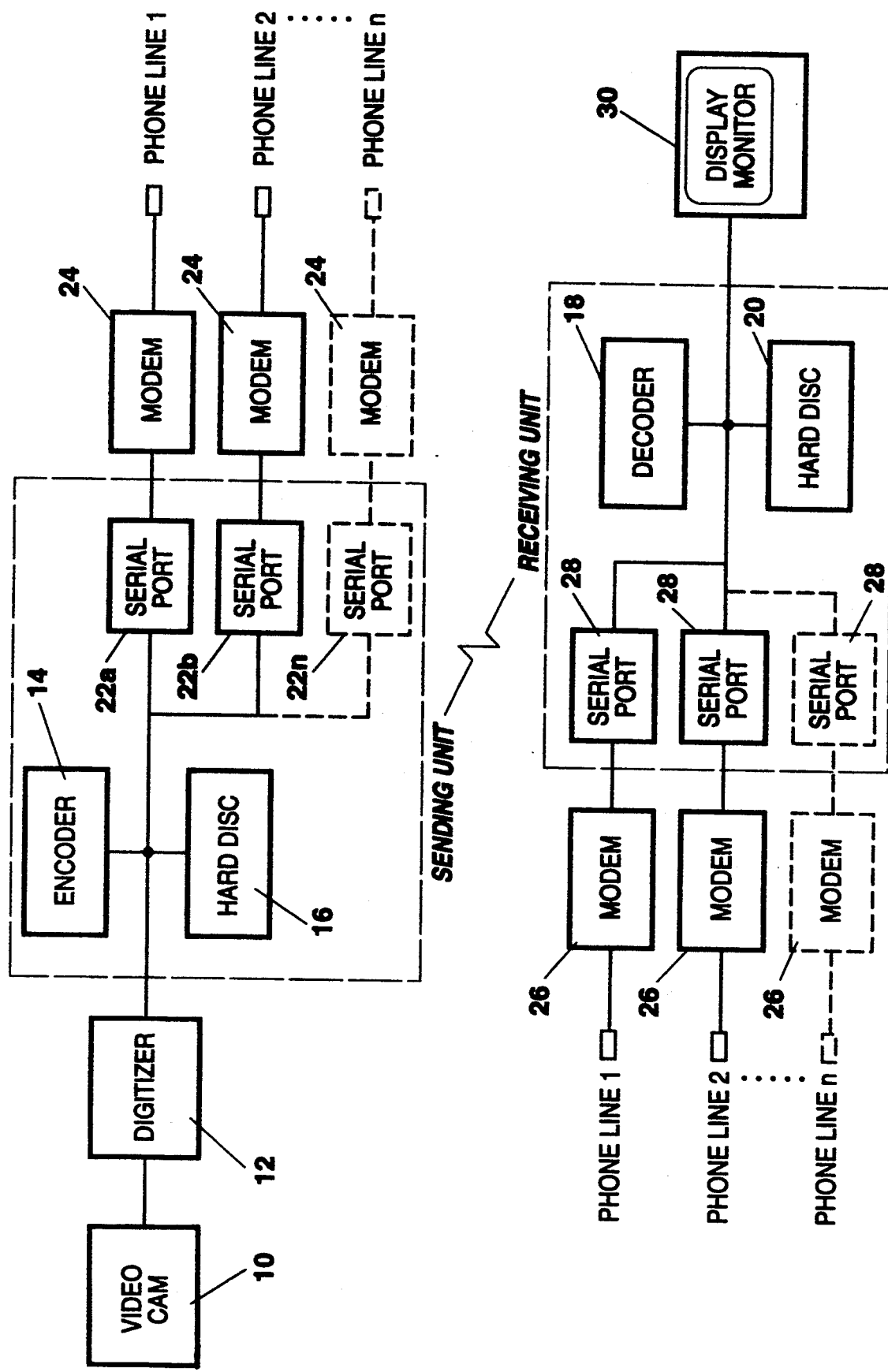

METHOD FOR INCREASING DIGITAL DATA THROUGHPUT OVER TELEPHONE LINES

BACKGROUND OF THE INVENTION

The present invention relates to a method for transmitting computer or digitally encoded data over multiple signal transmission means such as a telephone lines in order to increase throughput or decrease the amount of time necessary for the transmission of such data.

Computers manipulate information that has been coded into digital form. The digitally encoded information often needs to be transmitted from a source i.e. where the data is being generated, to a remote location computer, where the data is to be processed, or to a display, where the data is to be viewed.

Digital encoding of information is well known. It means that any information is described in a digital format or as a sequence of ones or zeroes referred to as bits. Most data in nature is first observed in analog form, that is in a gradation of amplitude or other variety of parameters. When such analog data is converted to digital, the number of bits of digital data increases exponentially.

If we were to take a black and white picture of a page of text, such representation is in analog form. To digitize the picture we would divide it into very small squares or rectangles and identify each as a white or black segment or as a one or zero. To get shades of gray and to make the picture appear smooth as opposed to grainy we need to make each of the small squares or rectangles very small. If we are to divide the document into a grid of 320 by 200 lines we come up with 64 thousand individual increments or pixels.

To achieve the illusion of motion or video pictures, the individual still pictures can be altered 30 or more times per second. From the perspective of digitizing we would then need to provide 1.92 mega bits of information per second. If we are to include color instead of black and white, and provide for 256 shades, the number of bits of data required increases further to about 500 mega bits per second, or about 64 mega Bytes.

A video camera or scanner device can generate the data in real time. Devices exist which can digitize the analog data generated by sensor devices such as video cameras. The digitized information is then stored in memory. To transmit the information to another location we need to have some means which can move very large amounts of digital data at the same time, or lacking such means we need to move the data seriatim and take the time until the data is transferred.

At the present time the transmission of video signals has been done typically in analog form, one reason being that it was difficult and slow to transmit such data in digital form.

The existing and convenient method available for the transmission of data is the telephone network. The telephone network consists of a system which combines copper wire with radio, microwave, fiber optic and other transmission means. Due to the limitation of the copper wires and electronic switches inherent in the telephone network, there is presently a limit on the throughput or number of bits per unit time of digital data that can be sent over the telephone lines. That number is between 4800 and 9600 baud (bits per second).

Under current systems if a sensor device is generating digital data at a rate in excess of 9600 baud, the data can not be transmitted over the telephone system in real time. Instead the data must be stored and then transmitted over the telephone system from memory. At the receiving end the data is then fed into another memory where it can be reconstituted for presentation over a display means.

Various means have been suggested to reduce the amount of data being sent and thus reduce the time necessary to transmit such data. These alternative means include methods of data compression, selective data transmission and other shortcuts such that the receiving end, in effect regenerates the information originally observed at the sending end, from the highlights of observed information.

Even with all the data reduction methods, the amount of digital data is such that the constraints or throughput of the current telephone network does not satisfy the need.

This invention teaches a method for overcoming that limitation, and enabling a user to increase the throughput of digitized data over ordinary i.e. existing telephone networks.

SUMMARY OF THE INVENTION

An electrical signal transmission system consists of a sensor such as a video camera or a microphone which converts video images or sounds respectively into electrical signals. These electrical signals are then digitized such that a stream of ones and zeroes can be said to represent one frame of picture scan of an object, in the case of video, or one unit of time representation of the sounds, frequencies and intensities, received by the microphone.

The digitized bits of information are further labeled with location codes, called addresses, such that we know what each segment of data represents and how it is to be reconstituted at the receiving end. Additionally other information may be added such as parity check bits and error-correction code information which will assist in the proper reconstruction of the digitized data being transmitted.

There exist various formats which provide for the digitization of data into binary form, which are well known to those skilled in the art. One example include such formats as RTV, real time video, AVS, audio video standard and AVI, audio video interleave.

In order to transmit binary form digital data over telephone lines devices called modems are used. These devices allow the transmission of digital data at specified rates of throughput, which rates are limited by the telephone network itself. Although modems exist that can transfer data at rates in excess of 9600 baud, doing so over existing phone systems causes problems such as data unreliability and increased error rates.

To overcome this data transmission limitation, the source data must be stored in memory and then sequentially sent over the phone lines at the slow rate. This method incurs substantial delay. To transmit a 30 second 'sound bite' color video signal in digitized form over a telephone wire could take twenty to thirty minutes.

A purpose of the present invention is to reduce this time delay, without the need for enhancing the transmission network, and using the existing telephone network.

A further purpose of the present invention is to break up the data into segments of two or more pieces and transmitting such segments over two or more separate phone lines between the two locations. Thus the throughput is increased in proportion to the number of additional telephone lines used.

A further purpose of the present invention is to provide a means for creating a file out of the binary form digital information, breaking it out into a number of pieces, labeling said individual pieces of information in a sequential manner such that the individual segments may be transmitted concurrently over each available telephone line. At the receiving end the segments identifying codes are removed and the segments are then reconstituted to display the data in the form as originally gathered.

A further purpose of the present invention is to allow the transmission of digitized video signal or other data from remote locations using existing cellular telephones, thus enabling digital data transmission from wherever cellular coverage exists.

In this manner the aforementioned sound bite could be transmitted over ordinary phone lines with a minimum of delay, and from any location where a telephone link either cellular or hardware may be established.

BRIEF DESCRIPTION OF THE DRAWINGS

FIG. 1 is a block diagram of an exemplary transmission system over multiple telephone lines utilizing a video camera source and display monitor.

DETAILED DESCRIPTION OF THE PREFERRED EMBODIMENT

With reference to FIG. 1, the data transmission system consists of data in digital format stored in memory such as hard disk drive memory 16 of a sending unit typically a computer. The data may be entered into the hard disk from any means including a video camera 10 as shown. The data must be in digital form in order to be recorded on the computer disk storage. In the example of FIG. 1 a digitizer 12, converts the data to appropriate digital format.

The computer is equipped with a plurality of serial ports. The number of serial ports available to a particular computer embodying this invention is therefore a known quantity. The encoder 14 commands the hard disk memory 16 to open the main file and to establish the size of the relevant data file. The encoder then commands the hard disk to open an empty file. The encoder will then arrange to segment the relevant file into blocks. The number of blocks will be equivalent to the number of available phone lines, typically the number of serial ports. The relevant file is then read from the hard disk a block at a time and recorded into the empty file space with a name designator for each block. The names or labels given to the individual data blocks are a sequential numbers e.g. 001, 002 etc. In this manner all the separate blocks of data constituting the relevant data file are segmented and sequentially labeled and recorded in the hard disk. This procedure of segmentation and sequential labeling may be done at the time that a file is to be transmitted or it may be done in advance of such transmission. When it is desired to transmit the data over telephone lines a communications command is given which takes the individual blocks of data in the relevant file and transfers them one block at a time into each of the available serial ports 22. If there are four phone lines available then the first block of data would go out the first phone line and the second block the second phone line, and so on until all the available phone lines are being utilized. The next data file would be similarly broken up into a like number of blocks and transmitted in block form over the available phone lines. Subsequent blocks of data would follow in sequence each going to the next available phone line. In this manner the throughput of the data from the sending unit would be increased in direct proportion to the number of serial parts and telephone lines available. Any other means for improving the transfer of data may be used in conjunction with this method. If telephone lines with greater baud rate capability are available, then of course even greater throughput is achieved as each block of data could be transmitted in a shorter unit of time. If data compression techniques or other data reduction means are utilized, then lesser amounts of digital data need be transmitted to send the same information, thus increasing the effective speed of the transmission. The invention described here would increase the throughput of the data transferred over the telephone lines in any event. FIG. 1 shows a modem 24 connected to each of the serial ports. Such modems represent commercially available modems which may be installed internal of the sending and receiving units or externally, as shown. The phone lines shown in FIG. 1 could be connections to hand wired telephone jacks or if transmitting from a remote location, cellular phones could be used.

With reference to FIG. 1 again, the receiving unit or computer would have the same number of telephone lines coming in, and at least an equal number of serial ports, with a block of data being received at each serial port 26, through each modem 28. The decoder 18 at the receiving unit reads the name of each block of data received and stores the data block on the receivers hard disk 20 in sequence. The coded name of the block of data is removed and the entire relevant file is copied into the receiver's hard disk 20 in the exact same condition as it was originally recorded at the sending unit hard disk 16. The data can remain in storage or may be displayed on the display unit 30, or otherwise further processed.

The system described in the example provides for the transmission of video and sound data that is either still frames or short clips or video bites. Depending upon capacity of the hard disk drives or equivalent memory employed, and the number and capacity of serial parts and telephone lines available the method can be used to transmit continuous data from any source, whether audio, video, combined audio-video or data from remote special purpose sensors, wherever it is important to obtain the data rapidly and to avail oneself of the relative economy of the existing telephone network.

Whereas, the present invention has been described in relation to the drawings attached hereto, it should be understood that other and further modifications, apart from those shown or suggested herein, may be made within the spirit and scope of this invention.

What is claimed is:

1. A method for increasing the throughput of digital data transmission over existing telephone lines utilizing computers at the sending and receiving ends, comprising:

a sending computer with a plurality of serial ports each of which serial port is connected to a modem said modem connected to a telephone line a receiving computer with a plurality of serial ports each of which serial port is connected to a modem and said modem connected to a telephone line, the number of said receiving computer's serial ports, modems, and telephone lines being at least equal to the number of said serial ports, modems and telephone lines in the sending computer;

means for segmenting the data file into blocks equal to the number of actual serial ports available to the sending and receiving computers and labeling said blocks of data in a sequential order;

means for activating the transmission of said individual data blocks by the separate modems attached to the serial ports and monitoring the transmission of said data blocks, said transmissions being done concurrently, and means for reconstituting the sequentially labeled segmented data blocks into one data file in the proper sequence at the receiving computer.

* * * * *